March 26, 1935.    R. T. KALB    1,995,476
ELECTRIC CIRCUIT TESTER
Filed Jan. 24, 1934

INVENTOR;
RALPH T. KALB
BY Arthur C Eckert
ATTORNEY

Patented Mar. 26, 1935

1,995,476

UNITED STATES PATENT OFFICE 1,995,476

ELECTRIC CIRCUIT TESTER

Ralph T. Kalb, Maplewood, Mo.

Application January 24, 1934, Serial No. 708,030

2 Claims. (Cl. 175—183)

The object of my invention is to make an electric circuit tester that may be used to test all sizes and types of fuses, both plug and cartridge types as well as flash light lamps and automobile lamps of all sizes and types. In addition the device may be used for testing motors, radio circuits and many other types of electrical circuits. It finds particular application in testing the electrical circuits in all prevalent types of electrical accessories, such as toasters, meters, vacuum cleaners, etc. The testing in all these instances is to determine whether or not a short circuit exists in the electrical circuit. The device is portable and self contained and needs no power line for its operation. It is simple in construction, made of few parts that lend themselves readily to multiple production and may be cheaply made of standard materials. It finds particular application in the ordinary household where it is frequently necessary to make tests on the various and ever increasing electrical accessories. The device, as preferably made, resembles a flashlight in its external shape and appearance.

With these and other objects in view, my invention has relation to the novel construction herein described, pointed out in the claims and illustrated in the drawing in which Fig. 1 is a longitudinal elevation showing the device connected for detecting the short circuit in an electrical circuit, such as found in most electrical devices.

Figure 1:
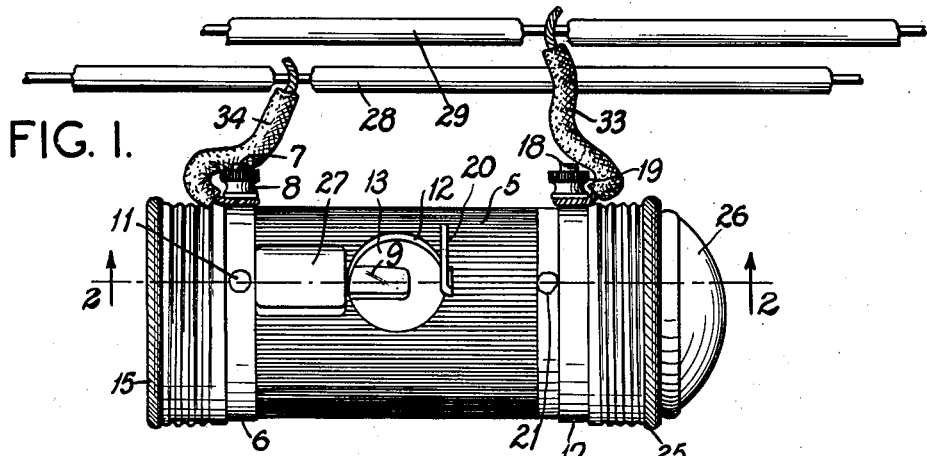

Numeral 5 designates the conventional fibre casing of circular section, such as is conventionally used in flash lights.

Numeral 6 designates the conventional metallic annulus, which is secured at one end of the fibre casing 5. The metallic annulus 6 is threaded externally and its external end is substantially flush with the end of the fibre casing 5. To the lateral external surface of the metallic annulus 6 is secured the binding post 7, to which is secured in threaded engagement the nut 8. Numeral 9 designates a conductor plate, which is secured to the inner surface of the fibre casing 5, by means of the rivet 10 and secured to the metallic annulus 6 by means of the rivet 11, which passes through the fibre casing 5 and through the conductor plate 9.

Numeral 12 designates a hole preferably circular formed in the fibre casing 5, substantially intermediate its length. The conductor plate 9 extends partly radially across the hole 12. Numeral 13 designates the conventional flash light storage battery, which is placed in frictional engagement in the fibre casing 5, with the central terminal 14 placed inwardly, that is to the right in Fig. 2. Numeral 15 designates the shell back, which is in frictional engagement with the external threads on the metallic annulus 6 on the end of the fibre casing 5. A spiral spring 16 is positioned on the inner surface of the shell back 15 with its smaller external end in contact with the back of the flash light storage battery 13. To the opposite end of the fibre casing 5 externally is secured the metallic annulus 17, which is externally threaded.

Figure 2:
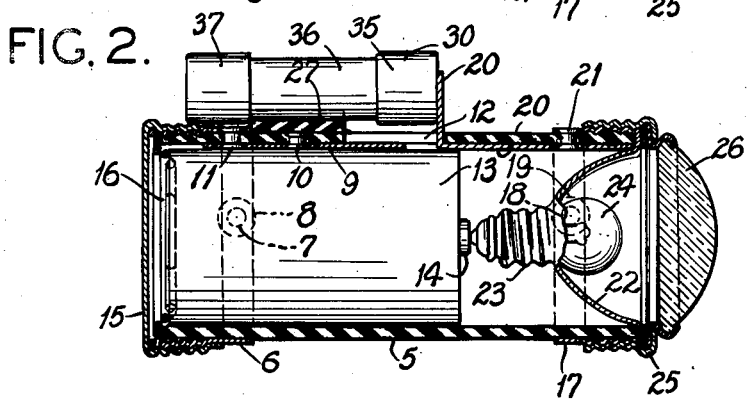
Fig. 2 is a longitudinal sectional elevation on the line 2—2 of Fig. 1 showing a fuse of the cartridge type in position on the device for the purpose of detecting an open circuit in the cartridge fuse.

Numeral 18 designates a binding post secured externally to the metallic annulus 17. The binding posts 7 and 18 are preferably placed in the same vertical plane. Numeral 19 designates a nut placed in threaded engagement on the binding post 18. Numeral 20 designates a conductor plate secured to the fibre casing 5 on its interior and to the metallic annulus 17, by means of the rivet 21. The internal end of the conductor plate 20 is bent at right angles to the lateral wall of the fibre casing 5 and extends upwardly through the hole 12 of the fibre casing 5. The ends of the conductor plate 9 and of the conductor plate 20 are not in contact, but are in spaced relationship as seen in Figs. 1 and 2.

Numeral 22 designates a reflector, which is of the conventional parabolic shape having its external diameter slightly greater than the inner diameter of the fibre casing 5. To the smaller end of the parabolic reflector 22 is secured the internally threaded cylinder 23. Numeral 24 designates the conventional light bulb, which is screwed into the internally threaded cylinder 23 of the reflector 22. The reflector 22, together with the light bulb 24, is placed at the right end of the fibre casing 5, so that the central terminal of the light bulb 24 is in frictional engagement with the central terminal 14 of the flash light storage battery 13.

Numeral 25 designates an internally threaded cap. Numeral 26 designates the conventional flash light lens, which is secured in frictional engagement in one end of the internally threaded cap 25. When the reflector 22 is in the position, previously indicated, the internally threaded cap 25 is screwed on to the external threads of the metallic annulus 17. By screwing the shell back 15 and the cap 25 tight, the relative position of the parts heretofore described will be that shown in Fig. 2. Binding post 7 represents the negative terminal and binding post 18 represents the positive terminal.

Numeral 27 designates a fuse rest or guard, which is preferably made of fibre, arcuate in cross section and secured to the lateral surface of the fibre casing 5, between the inner end of the metallic annulus 6 and the periphery of the hole 12. Numerals 28 and 29 designate the wires or elements of an electric circuit, which is to be tested for an open circuit. Numeral 30 designates a cartridge fuse, which is to be tested and numeral 31 designates a plug fuse, which is to be tested and numeral 32 designates a lamp which is to be tested.

It will be seen by the structure thus far described that an electric circuit is established starting from the conductor plate 20 to the metallic annulus 17, to the internally threaded cap 25 to the reflector 22, to the outside terminal of the light bulb 24 through the filament of the light bulb to the central terminal of the light bulb to the central terminal 14 of the battery, through the base of the battery and through the spiral spring 16, through the shell back 15 to the metallic annulus 6 and conductor plate 9. The circuit is open between the free ends of the conductor plate 9 and the conductor plate 20. The circuit may also be traced from the metallic annulus 17 together with its binding post 18, to the metallic annulus 6, together with its binding post 7. It is obvious that if the ends of the conductor plate 9 and the conductor plate 20 are placed in electrical contact by means of material through which electricity will pass, that the light bulb 24 will be lighted. It is likewise seen that if a wire 33 is placed in electrical contact with the binding post 18 and another electric wire 34 is placed in electrical contact with binding post 7, that if the ends of the wires 33 and 34 are contacted, the circuit will be formed so as to light the light bulb 24.

In this device, except in certain conditions to be subsequently described, the lighting of the light bulb 24 indicates that there is no open circuit in the object to be tested. In order to test a cartridge fuse 30 for an open circuit, one of the metallic caps 35 is placed in electrical contact with the upturned end of the conductor plate 20. The shank of the fuse 36 is supported on the fuse rest 27. In this position, the metallic cap 37 of the cartridge fuse 30 will rest in contact with either the metallic annulus 6 or the shell back 15 and will lie in a position parallel to the axis of the fibre casing 5. In this position, if there is no open circuit in the cartridge fuse 30, the current will pass through the fuse and light the light bulb 24. Obviously, if there is an open circuit in the cartridge fuse 30, no current will pass through it and the light bulb 24 will not light. The object of the fuse rest 27 is to facilitate the placing of the cartridge fuse 30 to be tested and to prevent one of the metallic caps, such as 35, from being placed in electrical contact with the ends of the conductor plate 9 and the conductor plate 20. Obviously, if the light bulb 24 lights in such a position of the cartridge fuse 30, the fact as to whether or not there is an open circuit in the cartridge fuse 30 would not be determined, because the current would simply pass through the metallic cap 35.

Figure 3:
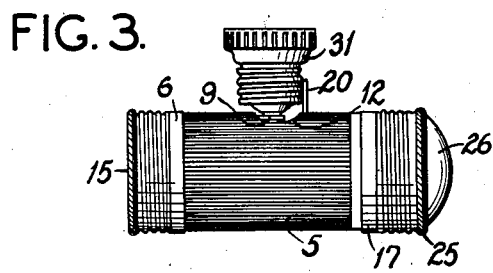
Fig. 3 is a longitudinal elevation reduced in size and showing the device when used to detect an open circuit in a fuse of the plug type.
Figure 4:
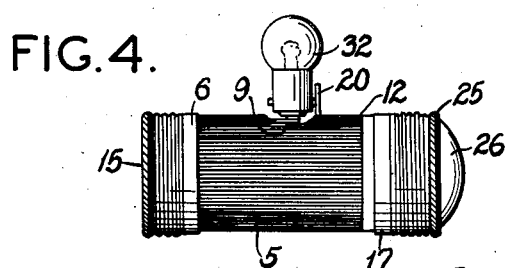
Fig. 4 is a longitudinal elevation similar to that of Fig. 3 showing the device in position to determine an open circuit in an electric light bulb.

In testing the fuse plug 31, it is placed in the position shown in Fig. 3, with the central terminal in contact with the conductor plate 9 and the screw thread of the plug 31 in contact with the upturned end of the conductor plate 20. If in this position of the fuse plug 31, the light bulb 24 is lighted, then the fact is determined that there is no open circuit in the fuse plug 31. Likewise in order to test the lamp 32 for an open circuit, it is positioned as shown in Fig. 4 with the central terminal in contact with the end of the conductor plate extending in the hole 12, and with the metallic base in contact with the upturned end of the conductor plate 20. If the lamp 32 is small and the resistance of its filament small, so that a small voltage will light it, then the lamp 32 will light, as well as the light bulb 24. If a larger lamp 32 is tested, that is a lamp in which the filament offers a substantially greater resistance, then the lamp, which requires a higher voltage to light it, is placed in the position shown in Fig. 4. The lamp 32 will not light, but the light bulb 24 will light. In any event, if either the lamp tested, lights, or if the light bulb 24 lights, it is an indication that there is no open circuit in the light. If there is an open circuit in the light, the tested lamp will not light and neither will the light bulb 24 be lighted.

In testing an electrical appliance, such as a toaster or percolator or vacuum cleaner, the circuit in the device to be tested is brought to view and one of the wires, such as 34, contacted with one end of the circuit and the other wire, such as 33 contacted with the other end of the circuit. If the light bulb 24 lights, then there is no open circuit. If it does not, there may be an open circuit. Obviously, if the electrical resistance in the circuit to be tested is too great, although there is no break or short circuit in the circuit, sufficient current would not flow through the circuit of the device, herein disclosed, to light the light bulb 24. To meet the contingency of testing electrical circuits of high resistance, a more powerful source of current must be used in the device, herein disclosed than a single flash light battery 13. The single flash light battery 13 is sufficient for most household appliances, such as fuses and small lights. For larger work, a plurality of batteries such as 13 may be positioned in an enlarged fibre casing 5, with the batteries placed in series, as in conventionally done in flash lights, where a plurality of batteries, such as 13 are used.

Applicant does not desire to be limited to a single battery. He likewise does not desire to be limited to the specific method of building up his structure. Obviously, the section 5 could be made of different material and the casing could be made of different cross sectional shape, and the method of securing the reflector light bulb, battery, etc. in the casing could be widely altered without departing from applicant's invention. Furthermore, the detecting means herein employed, such as the light bulb 24, could be any detecting means, such as a bell or buzzer. The light bulb, however, is the preferred form of detector.

What I claim is:

1. A device of the character described comprising a fibre casing having a metallic annulus secured at one end, which metallic annulus is externally threaded, a conductor plate secured to said casing internally and secured to said metallic annulus, a battery secured in frictional engagement in said casing, a shell back in threaded engagement with said metallic annulus, a spiral spring positioned between said battery and said shell back, said casing having a lateral hole formed therein, the inner end of said conductor plate terminating within the hole in said casing, a second conductor plate secured to said casing internally at its opposite end and having its inner end bent outwardly leaving a space between the conductor plates, a fuse rest positioned on said casing adjacent the hole in said casing, said fuse rest comprising an arcuate plate, a metallic annulus secured to the opposite end of said casing, and said second conductor plate and said annulus being in electrical contact, an internally threaded cap in threaded engagement on said metallic annulus, a lens secured in said internally threaded cap, a reflector positioned in said casing behind said lens, a lamp positioned in said reflector so as to have one terminal in contact with one of the terminals of said battery.

2. A device of the character described comprising a casing having a metallic annulus secured at one end, a conductor plate secured to said casing and secured to said metallic annulus, a battery secured in said casing, a shell back connected to said metallic annulus, a spring positioned between said battery and said shell back, said casing having a hole formed therein, the inner end of said conductor plate terminating within the hole in said casing, a second conductor plate secured to said casing internally at its opposite end and having its inner end bent outwardly leaving a space between the conductor plates, a metallic annulus secured to the opposite end of said casing and said second conductor plate and said annulus being in electrical contact, a cap threaded to said metallic annulus, a lens secured in said internally threaded cap, a reflector positioned in said casing adjacent said lens, a lamp positioned in said reflector so as to have one terminal in contact with one of the terminals of said battery.

RALPH T. KALB.